UNITED STATES PATENT OFFICE.

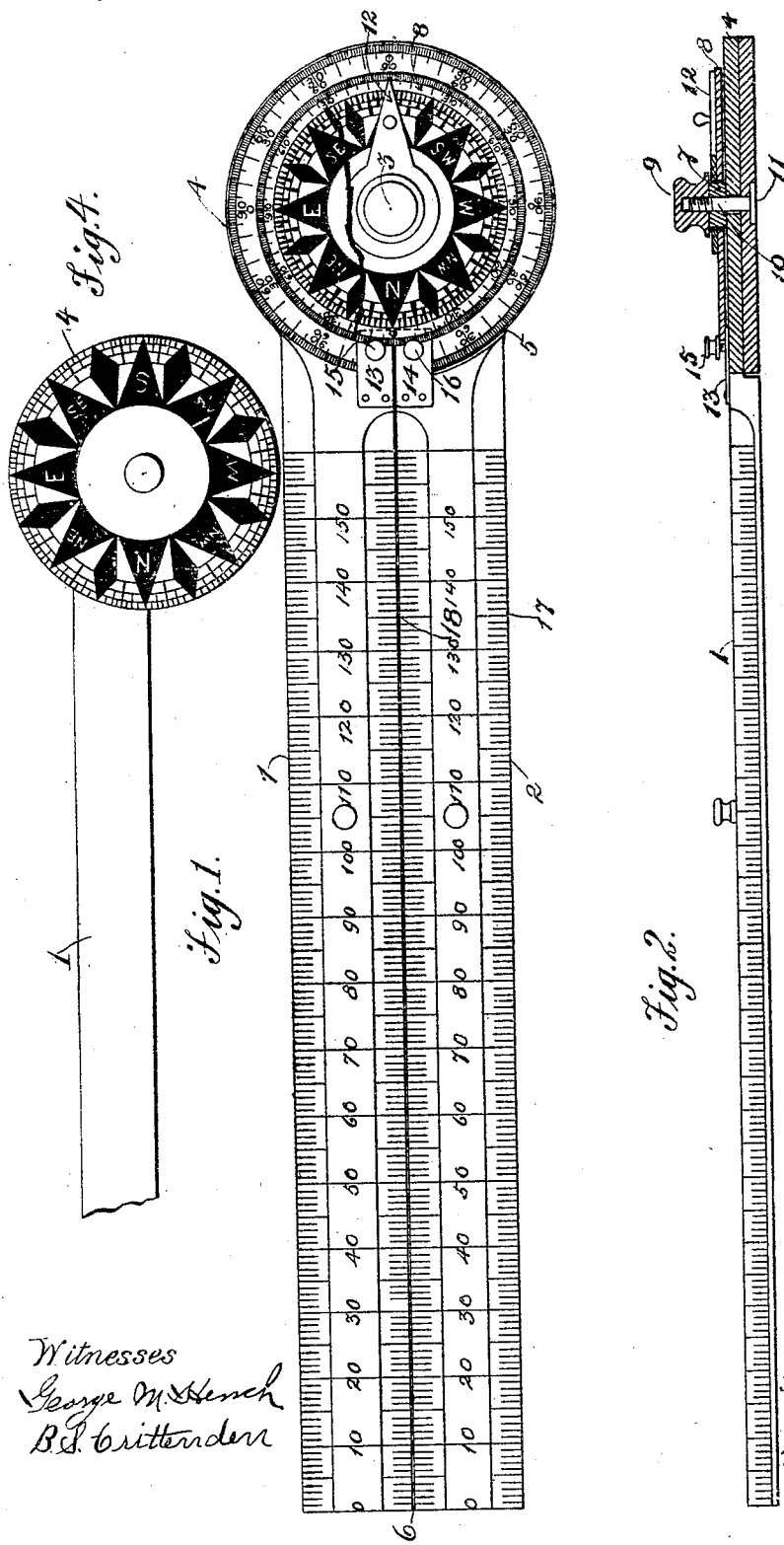

JOHN ARTHUR RYDMAN, OF FRUITVALE, CALIFORNIA.

COMPASS-RULER.

932,907.  Specification of Letters Patent.  Patented Aug. 31, 1909.

Application filed April 1, 1908. Serial No. 424,614.

*To all whom it may concern:*

Be it known that I, JOHN ARTHUR RYDMAN, a citizen of the United States, residing at Fruitvale, in the county of Alameda and State of California, have invented a new and useful Improvement in Compass-Rulers, of which the following is a specification in such full and clear terms as will enable those skilled in the art to construct and use the same.

My invention relates to the art of laying off and reading ships' courses and bearings on charts, and has for its object to provide new and improved means for laying off and reading courses. To understand its relation to the prior art it is to be borne in mind that directions on the earth are expressed in relation to a true north, and also in terms of a magnetic north, which varies in different degrees from the true north at different points on the earth's surface. Charts used in navigation have lines running to the true north and south, and to the true east and west, and at various positions on their surfaces, prints of compass cards showing the variation of the magnetic north from the true north at the indicated point on the earth's surface. To lay off a course on the chart it is required at present to correlate the chosen course with the directions on one of these compass cards by means of parallel rulers moved step by step over the surface of the chart between the point making the ship's position, and one of the compass cards. The operation is a difficult one on a rolling ship, as it demands that each of the parallel rules shall be maintained constant in direction at all times, as the rules are alternately advanced.

I attain my objects by the means illustrated in the accompanying drawing of which—

Figure 1 is a plan view of my compass ruler with part of upper disk broken away; Fig. 2, a longitudinal vertical, sectional view thereof, Fig. 3, an end view of one of the legs; Fig. 4 is a view of one of the disks marked with the points of the compass.

The same numeral of reference marks the same part throughout the various views.

My invention broadly expressed, consists in providing means for readily laying off or reading a course on such a chart, not by establishing a direct relation between it and one of the aforesaid compass cards, but by establishing a direct relation between it and one of the true north and south lines or one of the true east and west lines thereon.

It also consists in providing means for expressing directly the required course in terms of both the true north and the magnetic north.

It also consists in providing means for showing readily the required course in terms of the ship's compass as modified by the deviation due to local magnetic conditions.

It also consists in the constructions, combinations and arrangements hereinafter described and particularly pointed out in the claims.

I provide two legs 1, 2, each of these legs terminates in a circular disk 4, 5, said disks being concentric with each other, and turning on a pivot at 10. The surface of disk 4 is marked off into marks indicating circular arcs, as degrees or compass points. Fig. 1 shows the preferable marking, which is into degrees in two series in reverse order, and the degrees marked off into quadrants; whereby it shows four quadrants of 0 to 90 degrees, each of the marks being double, as 60 in one series being 30 in the other, 90 in one series being 0 in the other. The 0 of one of these quadrants is set accurately to the line 6, which marks the junction of the legs 1 and 2, and permanently fixed in that position.

Disk 4 is provided with a boss 7; and around this boss, and concentric with disks 4, and 5 is a disk 8, smaller than disk 4, and exposing the marks around the edge thereof, disk 8 bearing on its surface the markings of the mariner's compass. A thumb nut 9 screws downward on boss 7, and by means of screw 10 and head 11, locks the legs 1, and 2 in any angle. Above disk 8 I provide a revoluble pointer 12, the use of which is to mark the deviation of the needle on the disk 8. Plates 13, and 14, and thumb nuts 15, and 16, are provided to secure disk 8 in any desired position with relation to either leg, and thumb nut 9 being somewhat larger than the boss 7 prevents pointer 12, and disk 8, from coming off.

Along the edges of legs 1, and 2, are divisions spaced off twenty to the inch, which are used for measuring distances on a chart. It will be noted that the lines marking these divisions are at right angles to the edges of the rules, and that any point as 17, has a corresponding point 18 on the opposite edge of the rule, said points being situated at the extremities of imaginary straight lines drawn at right angles to the straight edges of the rules. The utility of the above-described arrangement will appear in the following description of how my compass ruler is operated.

There are two ways of using my device; one with, and one without disk 8. The course being chosen, leg 2, is turned in the direction and to the point on disk 4 marking that course. The proper allowance being made for magnetic variation. Leg 1, is then set to one of the north and south lines on the chart and leg 2 made to pass through the point marking the ship's position; whereupon a line drawn along the leg's straight edge marks the course on the chart. One of the east and west lines of the chart may be used instead of the north and south line, as a datum line for leg. The above-described mode of using my device will be used by some navigators who may prefer to do the little arithmetical calculations required rather than use the disk 8. But many will use disk 8 in preference, and in using my device with disk 8, the operation is as follows: The course being chosen, say N.W. or 45 degrees to the left of the junction line 6, and the magnetic variation being known say 20 degrees east, disk 8 is turned to the right until its zero point coincides with 20 degrees on the scale of disk 4. In this position disk 8 is clamped by thumb nut 15, and leg 2 is revolved until its edge along line 6 coincides with the northwest point on disk 4, which now makes an angle of 65 degrees with the true north point on disk 8, and clamped by thumb nut 9. This gives both the true and the magnetic course, reading on both scales; and if leg 1, is adjusted to a north and south line on the chart, the true and the magnetic course can be laid off by drawing one line along leg 2. But the sailing directions along this line have to be modified for the deviation of the compass due to local magnetic conditions. The amount of this deviation is experimentally determined in ways that need not be specified. Being known, the deviation is marked by the pointer 12. Suppose the deviation to be 10 degrees east, then the pointer is set to 10 degrees to the left of the magnetic course on card 8, and clamped by thumb nut 9, which makes the sailing course for a true north westerly course 75 degrees west of the north point on the ship's compass card. Where it is difficult to set my device to a true north and south line, leg 1 may be set to any east and west line of said chart so that said line passes through a division mark on one edge of the leg and the corresponding division mark on the opposite edge of said leg; and said marks being at right angles with said edges, said edges must indicate a north and south direction. The equal divisions on the legs 1, and 2 are usable to measure distances as scaled on a chart, by comparing the distances as shown on said leg with the scale.

Having described my invention what I claim as new and desire to secure by Letters Patent of the United States is, 1. A compass ruler comprising an upper circular disk having marks indicating circular divisions, a lower circular disk concentric therewith said disks being pivoted at their centers, a compass card smaller than the said upper circular disk, superposed thereon, and revoluble about said centers, a leg extending from each of said disks, and means for clamping said disks in any angular position of said legs.

2. A compass ruler comprising an upper circular disk having marks indicating circular divisions, a lower circular disk concentric therewith, said disks being pivoted at their centers, a compass card smaller than the said upper circular disk, superposed thereon and revoluble about said centers, a leg extending from each of said disks, means for clamping said compass card in fixed position with either leg, and means for clamping said disks in any position.

3. A compass ruler comprising an upper circular disk having marks indicating circular divisions, a lower circular disk concentric therewith, said disks being pivoted at their centers, a compass card smaller than the said upper circular disk, superposed thereon and revoluble about said centers, legs having equal divisions marked on the edges thereof extending from said disks, means for clamping said compass card in fixed position with either leg, and means for clamping said disks in any position.

4. A compass ruler comprising an upper circular disk having marks indicating circular divisions, a lower circular disk concentric therewith said disks being pivoted at their centers, a compass card smaller than the said upper circular disk, superposed thereon, and revoluble about said centers, a leg extending from each of said disks, means for clamping said compass card in fixed position, a pointer revoluble about said centers, and means for clamping said disks and said pointer in any position.

In testimony whereof I have set my hand this 16th day of March A. D. 1908, in the presence of the two subscribed witnesses.

JOHN ARTHUR RYDMAN.

Witnesses:
FRANK P. MEDINA,
EDITH W. BURNHAM.